(12) United States Patent
Zeng et al.

(10) Patent No.: US 12,441,657 B2
(45) Date of Patent: Oct. 14, 2025

(54) METHOD AND DEVICE FOR PRODUCING CONDUCTIVE GLASS FIBER MESH WITH LASER INDUCED COATING GRAPHENE

(71) Applicants: Chongqing Institute of East China Normal University, Chongqing (CN); ROI Optoelectronics Technology CO, LTD., Shanghai (CN); East China Normal University, Shanghai (CN)

(72) Inventors: Heping Zeng, Chongqing (CN); Chuan Yang, Chongqing (CN); Mengyun Hu, Chongqing (CN)

(73) Assignees: CHONGQING INSTITUTE OF EAST CHINA NORMAL UNIVERSITY, Chongqing (CN); ROI OPTOELECTRONICS TECHNOLOGY CO, LTD., Shanghai (CN); EAST CHINA NORMAL UNIVERSITY, Shanghai (CN)

( * ) Notice: Subject to any disclaimer, the term of this patent is extended or adjusted under 35 U.S.C. 154(b) by 893 days.

(21) Appl. No.: 17/528,806

(22) Filed: Nov. 17, 2021

(65) Prior Publication Data

US 2022/0153639 A1    May 19, 2022

(30) Foreign Application Priority Data

Nov. 17, 2020    (CN) .......................... 202011283199.5

(51) Int. Cl.
*C03C 25/12*    (2006.01)
*C03C 25/44*    (2006.01)
(Continued)

(52) U.S. Cl.
CPC .............. *C03C 25/12* (2013.01); *C03C 25/44* (2013.01); *H01B 1/06* (2013.01)

(58) Field of Classification Search
CPC ..................................................... C03C 25/12
See application file for complete search history.

(56) References Cited

U.S. PATENT DOCUMENTS 3,857,688 A * 12/1974 Wisnewski ............. F01N 3/021
55/498
5,868,889 A *  2/1999 Kahler ................... B01D 46/10
156/247
(Continued)

FOREIGN PATENT DOCUMENTS

CN      102877368 A  *  1/2013
CN      106245423 A  * 12/2016  ............. C03B 37/02
(Continued)

OTHER PUBLICATIONS

CN 102877368 translation (Year: 2013).*
(Continued)

*Primary Examiner* — Cachet I Proctor
(74) *Attorney, Agent, or Firm* — Hodgson Russ LLP

(57) ABSTRACT

A method for producing a conductive glass fiber mesh with laser induced coating graphene comprises: (I) preparing a glass fiber paper coated with a carbon-containing precursor material; (II) subjecting the glass fiber paper coated with the carbon-containing precursor material to laser irradiation to reduce the carbon-containing precursor material into the laser induced coating graphene, obtaining a glass fiber paper coated with the laser induced coating graphene; and (III) folding the glass fiber paper coated with the laser induced coating graphene to obtain the conductive glass fiber mesh with laser induced coating graphene.

9 Claims, 4 Drawing Sheets

(51) Int. Cl.
  *D21J 3/00* (2006.01)
  *H01B 1/06* (2006.01)

(56) References Cited

U.S. PATENT DOCUMENTS

| | | | | |
|---|---|---|---|---|
| 6,302,932 B1* | 10/2001 | Unger | ................ | B01D 19/0031 55/306 |
| 2007/0113741 A1* | 5/2007 | Shiau | ................ | B01D 46/62 96/154 |
| 2010/0247801 A1* | 9/2010 | Zenasni | ................ | H01L 21/0262 427/559 |
| 2013/0008849 A1* | 1/2013 | Gehwolf | ................ | B01D 46/522 493/405 |
| 2014/0202123 A1* | 7/2014 | Walz | ................ | B01D 46/521 210/493.5 |
| 2014/0294680 A1* | 10/2014 | Sevy | ................ | A61L 9/14 422/121 |
| 2015/0273985 A1* | 10/2015 | Luley | ................ | B01D 46/64 96/134 |
| 2016/0067648 A1* | 3/2016 | Unger | ................ | B01D 46/0036 96/108 |
| 2016/0137507 A1* | 5/2016 | You | ................ | C01B 32/194 428/408 |
| 2019/0330064 A1* | 10/2019 | Tour | ................ | H01G 11/36 |
| 2021/0140096 A1* | 5/2021 | Zhang | ................ | B01D 39/2017 |

FOREIGN PATENT DOCUMENTS

| | | | | |
|---|---|---|---|---|
| CN | 107837621 A | * | 3/2018 | ......... B01D 46/0028 |
| CN | 110167877 | | 8/2019 | |
| CN | 110218001 | | 9/2019 | |
| CN | 110550624 | | 12/2019 | |

OTHER PUBLICATIONS

CN106245423 translation (Year: 2013).*
CN107837621 translation (Year: 2018).*
CNIPA, First Office Action for CN Application No. 202011283199.5, Dec. 26, 2022.

* cited by examiner

METHOD AND DEVICE FOR PRODUCING CONDUCTIVE GLASS FIBER MESH WITH LASER INDUCED COATING GRAPHENE

CROSS-REFERENCE TO RELATED APPLICATION

This application claims priority to, and the benefits of, Chinese Patent Application No. 202011283199.5, filed on Nov. 17, 2020, the entire contents of which are incorporated herein by reference.

FIELD

The present disclosure relates to a method and device for producing a conductive glass fiber mesh with laser induced coating graphene.

BACKGROUND

For preventing and controlling the spread of infectious diseases, it is important to effectively control transmission and spread of viruses and bacteria in an environment with high concentration of people and poor air flowability.

Generally, in office buildings, theaters, shopping malls and other public places with poor air flowability, viruses and bacteria are easy to spread, and the use of air conditions or ventilation systems even expand the spread of the viruses and bacteria due to lack of any sterilization process. In general, air purifying and filtering devices use a glass fiber mesh as a filter to purify the environment. The glass fiber mesh has a dense structure composed of high-strength continuous monofilament glass fiber, which may block, absorb and store dust, exhaust gas and smoke in the air and the environment. Such glass fiber filtering mesh even may be applied to high cleanliness environments such as industrial clean rooms, chip workshops, operating rooms, high-end purification and high-end fresh air systems. However, due to the electric insulating property of the glass fiber, the glass fiber mesh cannot be used for disinfection and sterilization by a high current generated by applying voltage.

Therefore, there is a need to provide a glass fiber mesh with improved disinfection and sterilization effects.

SUMMARY

Embodiments of the present disclosure seek to solve at least one of the problems existing in the related art to at least some extent.

According to a first aspect of the present disclosure, a method for producing a conductive glass fiber mesh with laser induced coating graphene is provided. The method includes:

(I) preparing a glass fiber paper coated with a carbon-containing precursor material;

(II) subjecting the glass fiber paper coated with the carbon-containing precursor material to laser irradiation to reduce the carbon-containing precursor material into the laser induced coating graphene, obtaining a glass fiber paper coated with the laser induced coating graphene; and (III) folding the glass fiber paper coated with the laser induced coating graphene to obtain the conductive glass fiber mesh with laser induced coating graphene.

According to a second aspect of the present disclosure, a device for producing a conductive glass fiber mesh with laser induced coating graphene is provided. The device includes:

a laser section, configured to provide energy to convert a carbon-containing precursor material in a glass fiber paper into the laser induced coating graphene, and comprising:
  a laser, selected from a semiconductor laser, a fiber laser, or a $CO_2$ laser,
  an optical path transmission portion,
  a laser focusing head, configured to adjust a spot size in different processing, and
  a motor, configured to control movement of the laser focusing head in an XY plane, and selected from a servo motor or a stepping motor;

a transfer platform section, comprising:
  a first working platform, configured to receive the glass fiber paper coated with the carbon-containing precursor material,
  a second working platform, configured to process the glass fiber paper coated with the carbon-containing precursor material by laser induction, and process the reversed glass fiber paper to form the laser induced coating graphene on upper and lower surfaces of the glass fiber paper, and
  a third working platform, configured to fold the glass fiber paper coated with the laser induced coating graphene to generate a glass fiber mesh coated with the laser induced coating graphene, and discharge the glass fiber mesh coated with the laser induced coating graphene,
  wherein the first working platform, the second working platform and the third working platform are connected by conveyor belts;

a sample turning section, configured to turn the glass fiber paper coated with the carbon-containing precursor material;

a sample folding section, configured to fold the glass fiber paper coated with the laser induced coating graphene; and a controller, configured to control the laser section, the transfer platform section, the sample turning section and the sample folding section.

In a third aspect of the present disclosure, there is provided a conductive glass fiber mesh with laser induced coating graphene which is produced by the method as described above.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1A:
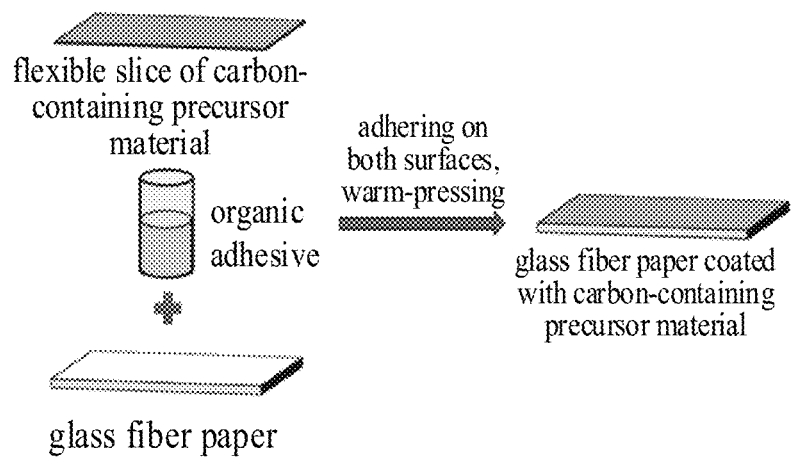
FIG. 1(a) is a schematic diagram illustrating the preparation of a glass fiber paper coated with a carbon-containing precursor material according to embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

An object of embodiments of the present disclosure is to provide a method and device for producing a conductive glass fiber mesh with laser induced coating graphene, which has excellent electrical conductivity and significantly improved adsorption performance, and can realize good sterilization and disinfection effect by applying voltage.

In a first aspect of the present disclosure, a method for producing a conductive glass fiber mesh with laser induced coating graphene is provided. The method includes:
(I) preparing a glass fiber paper coated with a carbon-containing precursor material;
(II) subjecting the glass fiber paper coated with the carbon-containing precursor material to laser irradiation to reduce the carbon-containing precursor material into the laser induced coating graphene, obtaining a glass fiber paper coated the laser induced coating graphene; and
(III) folding the glass fiber paper coated with the laser induced coating graphene to obtain the conductive glass fiber mesh with laser induced coating graphene.

In some embodiments, the carbon-containing precursor material is selected from a non-polymeric carbon material, a synthetic organic compound, a natural organic compound, a graphene oxide, and a carbon-based quantum material.

In some embodiments, the carbon-containing precursor material is in a form of film, flake, powder, dispersion, or quantum dots.

In some embodiments, the non-polymeric carbon material includes, but not limited to, graphite, charcoal, and coal.

In some embodiments, the synthetic organic compound includes, but not limited to, polyimide (PI) and polyethylene (PE).

In some embodiments, the natural organic compound includes, but not limited to, glucose, sucrose, starch, cellulose, lignin or a combination thereof.

In some embodiments, the glass fiber paper coated with the carbon-containing precursor material has glass fibers with a diameter of 3 μm to 80 μm, and ultra-fine glass fibers with a diameter of 0.5 μm to 3.5 μm.

In some embodiments, the glass fiber paper coated with the carbon-containing precursor material is prepared by a wet papermaking process, which includes:
(i) preparing a dispersion of the carbon-containing precursor material;
(ii) preparing a mixed pulp of the carbon-containing precursor material and glass fibers; and
(iii) pressing the mixed pulp into the glass fiber paper coated with the carbon-containing precursor material on upper and lower surfaces thereof.

In some embodiments, in step (ii), to the mixed pulp of the carbon-containing precursor material and the glass fibers, pyruvic acid or phenolic resin is added as a binder, and a silicone coupling agent is added as a coupling agent.

In some embodiments, the mixed pulp of the carbon-containing precursor material may be added with nanoparticles selected from Au, Ag, Cu, ZnO, $TiO_2$, or a combination thereof.

In some embodiments, before the step (II), the method further may include: subjecting the glass fiber paper coated with the carbon-containing precursor material to carbonization. The carbonization may be performed by heating, which is selected from flame furnace heating, resistance furnace heating, infrared heating, laser irradiation heating, microwave radiation heating, or a combination thereof.

The laser irradiation may be selected from laser parallel irradiation, laser focusing irradiation, laser defocusing irradiation, or a combination thereof. The laser parallel irradiation has a changeable laser irradiation area. For example, a large-area laser parallel irradiation may be used. The laser focusing irradiation may be selected from laser irradiation at a focal position and laser irradiation at a defocus position. The laser defocusing irradiation has a changeable laser irradiation area. For example, a large-area laser defocusing irradiation may be used.

In some embodiments, an energy density of the laser irradiation is greater than or equal to an energy density threshold required for the carbonization of the carbon-containing precursor material. The laser irradiation may be continuous laser irradiation or pulsed laser irradiation, and a wavelength of the laser irradiation is 700 nm to 10600 nm in an infrared region.

In some embodiments, the microwave radiation may be continuous microwave radiation or pulsed microwave radiation.

In some embodiments, wherein in step (II), subjecting the glass fiber paper coated with the carbon-containing precursor material to laser irradiation includes: subjecting the glass fiber paper coated with the carbon-containing precursor material to laser irradiation scanning to convert the carbon-containing precursor material into the laser induced coating graphene, so as to produce the glass fiber paper coated with the laser induced coating graphene.

In some embodiments, the laser irradiation scanning may be selected from continuous scanning with a small spot at a focal position, or continuous scanning with a large spot at a defocus position. The continuous scanning may be selected from a single continuous scanning mode or a multiple continuous scanning mode.

An energy density of the laser irradiation is greater than or equal to an energy density threshold required to convert the carbon-containing precursor material into the laser induced coating graphene. The laser irradiation may be continuous laser irradiation or pulsed laser irradiation. A wavelength of the laser irradiation may be 200 nm to 400 nm in an ultraviolet region, 400 nm to 700 nm in a visible region, or 700 nm to 10600 nm in an infrared region. Preferably, the wavelength of the laser irradiation may be 400 nm to 700 nm in the visible region, or 700 nm to 10600 nm in the infrared region.

In some embodiments, subjecting the glass fiber paper coated with the carbon-containing precursor material to laser irradiation scanning includes: subjecting upper and lower surfaces of the glass fiber paper coated with the carbon-containing precursor material to laser irradiation scanning, such that the upper and lower surfaces of the glass fiber paper are coated with the laser induced coating graphene.

In some embodiments, the glass fiber is entirely coated by the laser induced coating graphene.

In a second aspect of the present disclosure, a device for producing a conductive glass fiber mesh with laser induced coating graphene is provided. The device includes: a laser section, a transfer platform section, a sample turning section, a sample folding section and a controller.

The laser section is configured to provide energy for converting a carbon-containing precursor material in a glass fiber paper into the laser induced coating graphene. The laser section includes a laser, an optical path transmission portion, a laser focusing head and a motor. The laser may be selected from a semiconductor laser, a fiber laser, or a $CO_2$ laser. The laser focusing head is configured to adjust a spot size in different processing. The motor is configured to control movement of the laser focusing head in an XY plane, and may be selected from a servo motor or a stepping motor.

The transfer platform section includes a first working platform, a transfer platform section and a third working platform, which are connected by conveyor belts. The first working platform is configured to receive the glass fiber paper coated with the carbon-containing precursor material. The transfer platform section is configured to process the glass fiber paper coated with the carbon-containing precursor material by laser induction, and process the reversed glass fiber paper to form the laser induced coating graphene on upper and lower surfaces of the glass fiber paper. The third working platform is configured to fold the glass fiber paper coated with the laser induced coating graphene to generate a glass fiber mesh coated with the laser induced coating graphene, and discharge the glass fiber mesh coated with the laser induced coating graphene.

The sample turning section is configured to turn the glass fiber paper coated with the carbon-containing precursor material.

The sample folding section is configured to fold the glass fiber paper coated with the laser induced coating graphene.

The controller is configured to control the laser section, the transfer platform section, the sample turning section and the sample folding section.

In a third aspect of the present disclosure, there is provided a conductive glass fiber mesh which is produced by the method as described above. The conductive glass fiber mesh is entirely coated with the laser induced coating graphene, and thus has excellent electrical conductivity.

In the method and device for producing the conductive glass fiber mesh with the laser induced coating graphene according to embodiments of the present disclosure provides, by using the laser induced coating graphene (LLCG) technology, the carbon-containing precursor material is reduced and converted into graphene, and the graphene is chemically bonded with oxide molecules (such as $SiO_2$) in the glass fiber via a covalent bond, such that the glass fiber is entirely coated by the graphene to obtain the conductive glass fiber mesh coated with the laser induced coating graphene on its both surfaces. In the present disclosure, due to the excellent electrical conductivity and adsorption properties of the graphene, the glass fiber mesh coated with the graphene not only has significantly improved adsorption performance, but also has electrical conductivity, such that by applying voltage on the conductive glass fiber mesh, the viruses and bacteria attached to or passing through the conductive glass fiber mesh can be killed efficiently and quickly, thereby realizing high sterilization and disinfection effects. Meanwhile, thanks to the excellent thermal conductivity of the graphene, the thermal effect of the glass fiber mesh generated by application of voltage during the sterilization and disinfection may be reduced, thereby extending the service life of the glass fiber mesh. In addition, the present disclosure not only may be used in sanitary and anti-epidemic fields, but also has important significance and application prospect in heavy metal adsorption, sewage disposal, water purification, electrochemical deposition, soil remediation, seawater desalination, precious metal extraction, trash penetrating fluid processing and so on.

In addition, embodiments of the present disclosure are not limited to the coating of the graphene-glass fiber system, and may also be applied to coat composite materials which include simple two-dimensional materials such as silylene and germylene, transition metal dichalcogenides (TMDC) such as $MoS_2$ and $ReS_2$ as coating materials, and base materials such as a hemp fiber, a synthetic fiber or a non-woven fabric. Therefore, the present disclosure has an important guiding significance for the preparation of composite materials by coating two-dimensional materials.

In the following, the method and device for producing a conductive glass fiber mesh with laser induced coating graphene according to embodiments of the present disclosure will be described with reference to the following examples and accompanying drawings.

In the method, a glass fiber paper coated with a carbon-containing precursor material may be prepared by ways as illustrated in the following examples.

Example 1

A flexible PI slice (or film) and a glass fiber paper are used as raw materials for preparing a glass fiber paper coated with a carbon-containing precursor material. As shown in FIG. 1(a), the flexible PI slice is cut to have a same size as the glass fiber paper, a high-performance organosilicon pressure sensitive adhesive is coated on the flexible PI slice, and then the flexible PI slices are adhered on upper and lower surfaces of the glass fiber paper, followed by warm-pressing at 180° C. to obtain the glass fiber paper covered with PI on both surfaces.

Example 2

Figure 1B:
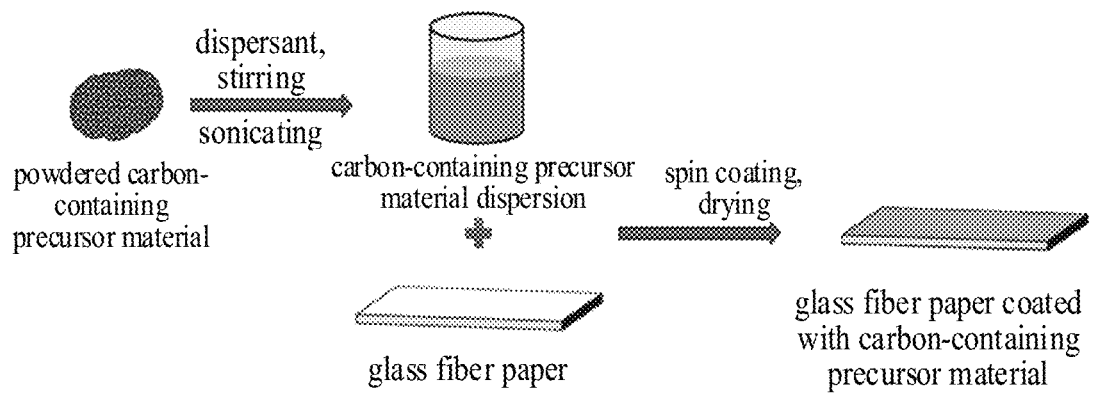
FIG. 1(b) is a schematic diagram illustrating the preparation of a glass fiber paper coated with a carbon-containing precursor material according to embodiments of the present disclosure.

PI thermoplastic powders and a glass fiber paper are used as raw materials for preparing a glass fiber paper coated with a carbon-containing precursor material. Specifically, as shown in FIG. 1(b), the preparation of the glass fiber paper coated with the carbon-containing precursor material includes steps as follows.

(1) Preparation of a dispersion of the carbon-containing precursor material: the PI thermoplastic powders are used as the carbon-containing precursor material to prepare a PI thermoplastic solution, to which a dispersant is added, followed by a sonicating treatment to obtain a uniform dispersion of the PI carbon-containing precursor material.

(2) Coating of the glass fiber paper: the dispersion of the PI carbon-containing precursor material is uniformly coated on a surface of the glass fiber paper by spin coating with a thickness of 50 μm to 100 μm, so as to obtain a glass fiber paper coated with the dispersion of PI carbon-containing precursor material.

(3) Drying of the glass fiber paper coated with the carbon-containing precursor material: the glass fiber paper coated with the dispersion of the PI carbon-containing precursor material is placed on a drying plate at 100° C. for drying to obtain a glass fiber paper coated with the PI carbon-containing precursor material on one surface.

(4) Preparation of a glass fiber paper coated with the carbon-containing precursor material on both surfaces: the glass fiber paper coated with the PI precursor material on one surface is turned, and then the above steps (2) and (3) are repeated, so as to obtain the glass fiber paper coated with the PI carbon-containing precursor material on both surfaces.

Example 3

Figure 1C:
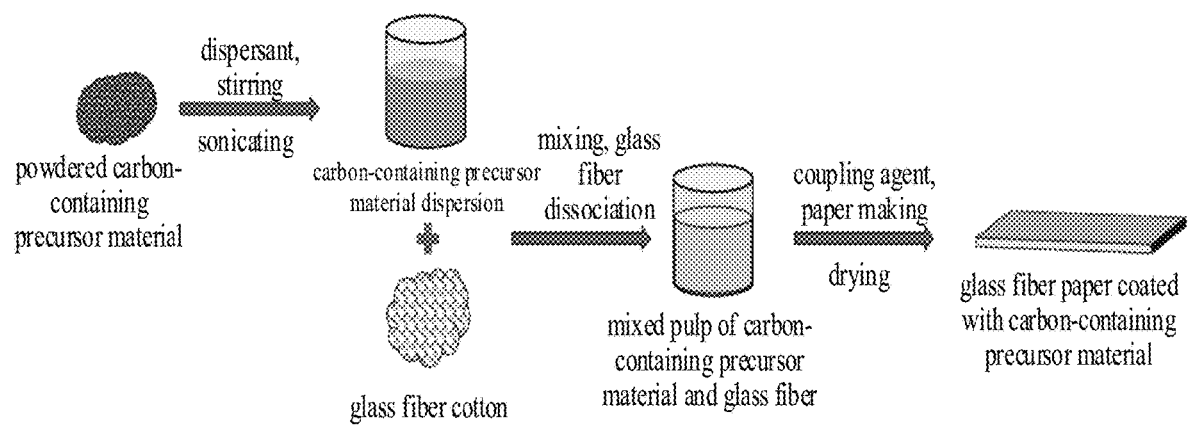
FIG. 1(c) is a schematic diagram illustrating the preparation of a glass fiber paper coated with a carbon-containing precursor material according to embodiments of the present disclosure.

Carbon-containing precursor materials including PI, graphite and glucose and a glass fiber cotton are used as raw materials for preparing a glass fiber paper coated with carbon-containing precursor materials. As shown in FIG. 1(c), the preparation of the glass fiber paper coated with the carbon-containing precursor materials includes steps as follows.

(1) Preparation of a dispersion of the carbon-containing precursor materials: a solution containing the PI thermoplastic powders, the graphite and the glucose as the carbon-containing precursor materials is prepared, to which a dispersant is added, followed by a sonicating treatment to obtain a uniform dispersion containing a variety of carbon-containing precursor materials.

(2) Preparation of a mixed pulp of the carbon-containing precursor materials and the glass fiber: the ultrafine glass fiber cotton is fully immersed in the dispersion of the carbon-containing precursor materials, and the glass fiber cotton is dispersed by using a fiber dissociator to obtain the mixed pulp of the carbon-containing precursor materials and the glass fiber.

(3) Preparation of the glass fiber paper coated with the carbon-containing precursor materials: the mixed pulp of the carbon-containing precursor materials and the glass fiber is formed into a wet paper by a papermaking machine through a wet papermaking process, and then the formed wet paper is immersed in an adhesive system containing a silicone coupling agent, followed by drying on a drying plate at 100° C. to obtain the glass fiber paper containing a variety of carbon-containing precursor materials.

Figure 2:
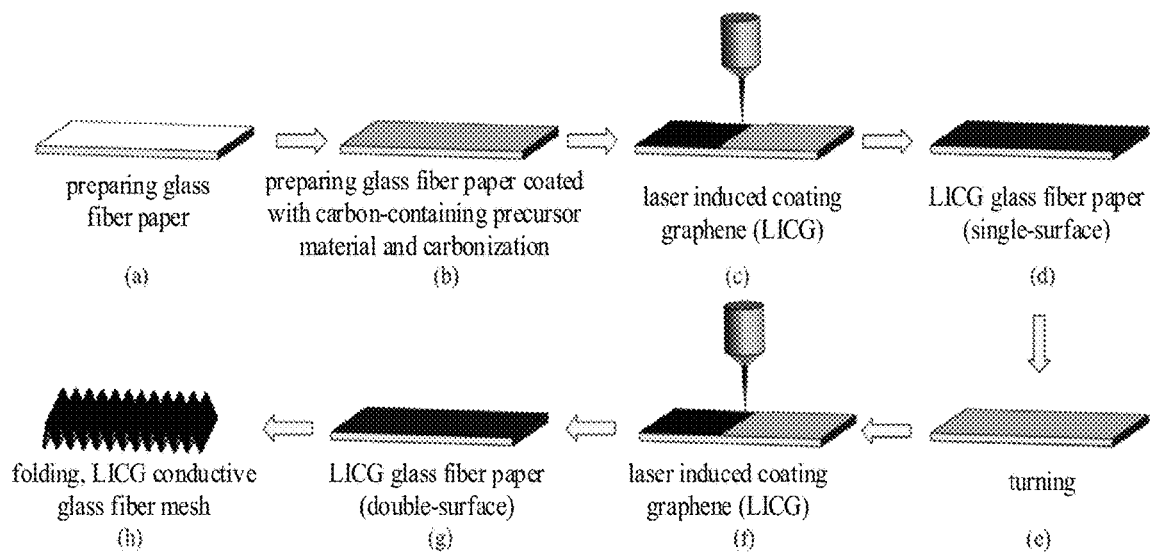
FIG. 2 is a flow chart illustrating the preparation of a conductive glass fiber mesh with laser induced coating graphene according to embodiments of the present disclosure.

FIG. 2 is a flow chart illustrating a method for producing a conductive glass fiber mesh with laser induced coating graphene according to embodiments of the present disclosure. The method includes steps as follows.

(I) A carbon-containing precursor material and a glass fiber paper are prepared.

(II) Preparation of a glass fiber paper coated with a carbon-containing precursor material and carbonization: the glass fiber paper coated with the carbon-containing precursor material may be prepared in any way as described in Examples 1-3, and then the carbon-containing precursor material in the glass fiber paper is subjected to carbonization by laser irradiation or microwave radiation.

(III) Treatment with laser induced coating graphene (LICG) technique: a surface of the glass fiber paper coated with the carbon-containing precursor material is scanned and processed by a $CO_2$ laser with a wavelength of 10.6 μm under controlled laser power, scanning speed and scanning resolution to reduce the carbon-containing precursor material in the glass fiber paper into laser induced coating graphene, obtaining a glass fiber paper coated with the laser induced coating graphene on one surface.

(IV) The glass fiber paper is turned to process the other face in the same way as described in step (III) to obtain a glass fiber paper coated with the laser induced coating graphene on both surfaces.

(V) Preparation of conductive glass fiber mesh: the glass fiber paper coated with the laser induced coating graphene on both surfaces is subjected to a folding process to obtain the conductive glass fiber mesh with the laser induced coating graphene. After folding, the conductive glass fiber mesh has a significantly increased specific surface area, such that the adsorption performance is improved significantly.

Figure 3A:
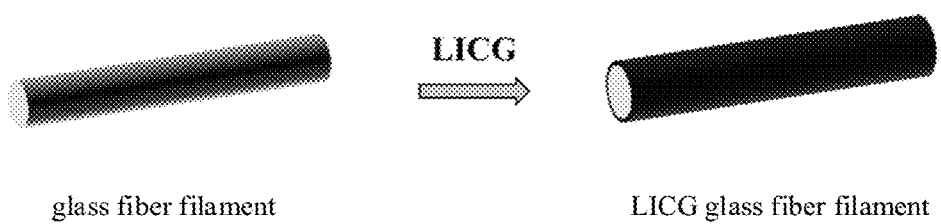
FIG. 3(a) is a schematic diagram showing a conductive glass fiber filament coated with laser induced coating graphene according to embodiments of the present disclosure.
Figure 3B:
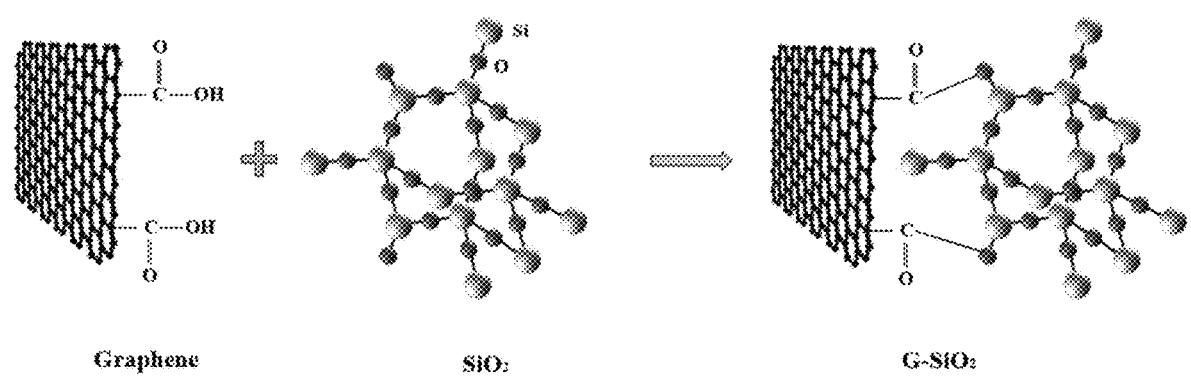
FIG. 3(b) is a schematic diagram showing the bonding between graphene and glass fiber according to embodiments of the present disclosure.

FIG. 3(a) is a schematic diagram showing a conductive glass fiber filament coated with laser induced coating graphene according to embodiments of the present disclosure. As shown in FIG. 3(a), on the macro level, the glass fiber filament in the glass fiber paper is entirely coated by the graphene through the LICG technology. On the micro level, in the LICG process, a local high temperature will be formed on a surface of the carbon-containing precursor material under the action of the laser, which will break chemical bonds between C atoms and other atoms such as O, H and N, and new substances generated by other atoms are volatilized at high temperature. Under rapid cooling, three outer electrons of the C atom form a strong 6 bond among the C atoms through $sp^2$ hybridization, and the remaining π electron forms a delocalized large π bond with π electrons of other C atoms, so as to form the graphene with a densely packed honeycomb structure. The graphene induced by the LICG technique generally has functional groups, which can be chemically bonded with various oxide molecules in the glass fiber through covalent bonds to obtain a complex. Generally, the glass fiber mainly includes $SiO_2$, $Al_2O_3$, CaO, $B_2O_3$, MgO, $Na_2O$ and so on. For example, as shown in FIG. 3(b), the glass fiber includes $SiO_2$, and graphene has carboxyl functional groups. In the LICG process, the C atom of the carboxyl functional group in the graphene may be chemically bonded with the O atom in the $SiO_2$ molecule, such that a $G-SiO_2$ chemical bond may be formed between the graphene and the $SiO_2$ molecule, realizing the coating of the glass fiber filament with laser-induced coating graphene.

Figure 4:
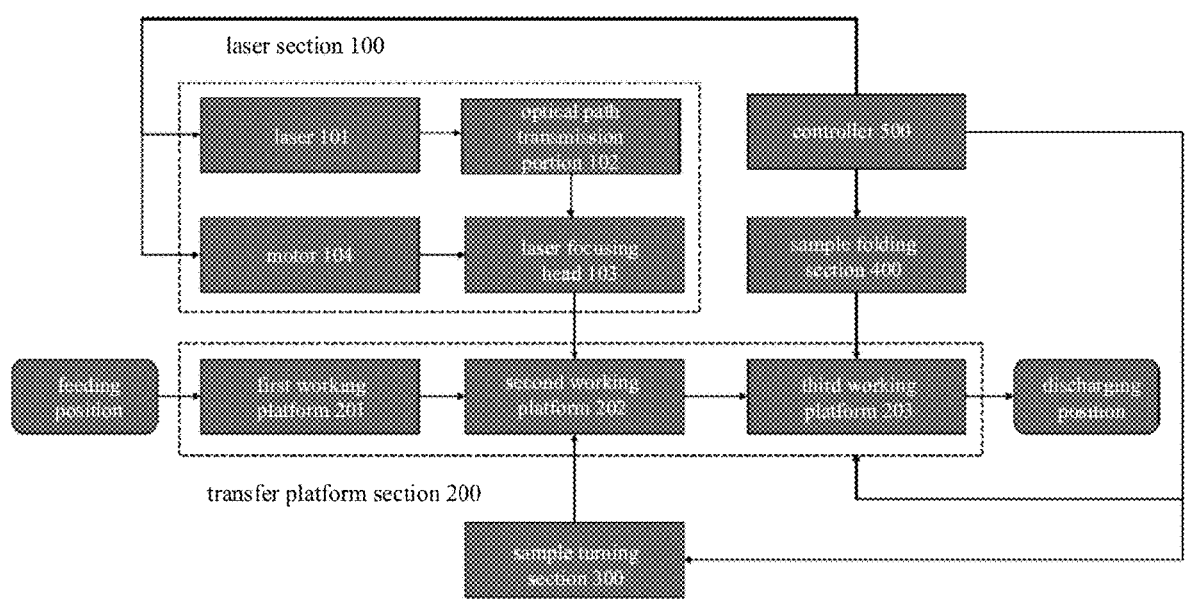
FIG. 4 is a schematic block diagram showing a device for producing a conductive glass fiber mesh with laser induced coating graphene according to embodiments of the present disclosure.

FIG. 4 is a block diagram showing a device for producing a conductive glass fiber mesh with laser induced coating graphene according to embodiments of the present disclosure.

The device includes a laser section 100, a transfer platform section 200, a sample turning section 300, a sample folding section 400 and a controller 500. The device is used for producing a conductive glass fiber mesh with laser induced coating graphene from a glass fiber paper coated with a carbon-containing precursor material, and is suitable for the batch automatic production of the conductive glass fiber mesh with the laser induced coating graphene. The device is not applicable to prepare the glass fiber paper coated with the carbon-containing precursor material.

The laser section 100 includes a laser 101, an optical path transmission portion 102, a laser focusing head 103 and a motor 104. The motor 104 is configured to control movement of the laser focusing head 103, such that a laser energy source may be used to scan and process in a working area of an XY plane. The laser section 100 is a most important component in the entire device and configured to provide energy for the laser induced coating graphene process, so as to convert a carbon-containing precursor material into the laser induced coating graphene. The laser section 100 is also configured to set parameters used in the LICG process, such as those related to laser energy source (including laser type, wavelength, power, pulse width, etc.), a spot form, a scanning speed, a processing range and so on.

The transfer platform section 200 may be used to automatically control the process of producing the conductive glass fiber mesh with the laser induced coating graphene, thereby realizing mass production. The transfer platform section 200 includes a first working platform 201, a second working platform 202 and a third working platform 203.

The first working platform 201 is connected to a feeding positon, through which the glass fiber paper coated with the carbon-containing precursor material is fed to the first working platform 201, and the carbon-containing precursor material is subjected to carbonization by laser irradiation or microwave irradiation at the first working platform 201. The glass fiber paper is then transferred to the second working platform 202, at which the glass fiber paper coated with the carbon-containing precursor material is processed by laser irradiation scanning, such that the carbon-containing precursor material in the glass fiber paper is converted into graphene to obtain a glass fiber paper coated with the laser induced coating graphene on one surface. The sample turning section 300 is configured to turn the glass fiber paper coated with the laser induced coating graphene on one surface, so as to allow the other surface of the glass fiber paper to be processed, thereby obtaining the glass fiber paper coated with the laser induced coating graphene on both surfaces. Then, the glass fiber paper coated with the laser induced coating graphene on both surfaces is transferred to the third working platform 203, at which the glass fiber paper is folded by the sample folding section 400 to obtain the conductive glass fiber mesh with the laser induced coating graphene. The conductive glass fiber mesh with the laser induced coating graphene is discharged from the third working platform 203.

The controller 500 is configured to control the laser section 100, the transfer platform section 200, the sample turning section 300 and the sample folding section 400, so as to control the entire device, thereby realizing an integrated control and monitoring to the entire producing process.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for producing a conductive glass fiber mesh with laser induced coating graphene, comprising:
    (I) preparing a glass fiber paper coated with a carbon-containing precursor material, wherein the glass fiber paper coated with the carbon-containing precursor material is prepared by a wet papermaking process comprising:
        (i) preparing a dispersion of the carbon-containing precursor material;
        (ii) preparing a mixed pulp of the carbon-containing precursor material and glass fibers; and
        (iii) pressing the mixed pulp into the glass fiber paper coated with the carbon-containing precursor material on upper and lower surfaces thereof;
    (II) subjecting the glass fiber paper coated with the carbon-containing precursor material to laser irradiation to reduce the carbon-containing precursor material into the laser induced coating graphene, obtaining a glass fiber paper coated with the laser induced coating graphene; and
    (III) folding the glass fiber paper coated with the laser induced coating graphene to obtain the conductive glass fiber mesh with laser induced coating graphene.

2. The method according to claim 1, wherein the carbon-containing precursor material is selected from a non-polymeric carbon material, a synthetic organic compound, a natural organic compound, a graphene oxide, and a carbon-based quantum material; and
    the carbon-containing precursor material is in a form of film, flake, powder, dispersion, or quantum dots.

3. The method according to claim 2, wherein the non-polymeric carbon material is selected from graphite, charcoal, and coal;
    the synthetic organic compound is selected from polyimide (PI) and polyethylene (PE); and
    the natural organic compound is selected from glucose, sucrose, starch, cellulose, lignin or a combination thereof.

4. The method according to claim 1, wherein the glass fiber paper coated with the carbon-containing precursor material has glass fibers with a diameter of 3 µm to 80 µm, and ultra-fine glass fibers with a diameter of 0.5 µm to 3.5 µm.

5. The method according to claim 1, wherein in step (ii), to the mixed pulp of the carbon-containing precursor material and the glass fibers, pyruvic acid or phenolic resin is added as a binder, a silicone coupling agent is added as a coupling agent, and nanoparticles selected from Au, Ag, Cu, ZnO, $TiO_2$, or a combination thereof are added.

6. The method according to claim 1, further comprising: subjecting the glass fiber paper coated with the carbon-containing precursor material to carbonization before the step (II);

wherein the carbonization is performed by heating, which is selected from flame furnace heating, resistance furnace heating, infrared heating, laser irradiation heating, microwave radiation heating, or a combination thereof;

the laser irradiation heating is selected from laser parallel irradiation, laser focusing irradiation, laser defocusing irradiation, or a combination thereof;

the laser parallel irradiation has a changeable laser irradiation area, preferably a large laser irradiation area;

the laser focusing irradiation is selected from laser irradiation at a focal position and laser irradiation at a defocus position;

the laser defocusing irradiation has a changeable laser irradiation area, preferably a large laser irradiation area;

an energy density of the laser irradiation is greater than or equal to an energy density threshold required for the carbonization of the carbon-containing precursor material, the laser irradiation is continuous laser irradiation or pulsed laser irradiation, and a wavelength of the laser irradiation is 700 nm to 10600 nm in an infrared region; and the microwave radiation is continuous microwave radiation or pulsed microwave radiation.

7. The method according to claim 1, wherein in step (II), subjecting the glass fiber paper coated with the carbon-containing precursor material to laser irradiation comprises:

subjecting the glass fiber paper coated with the carbon-containing precursor material to laser irradiation scanning to convert the carbon-containing precursor material into the laser induced coating graphene, so as to produce the glass fiber paper with laser induced coating graphene;

wherein the laser irradiation scanning is selected from continuous scanning with a small spot at a focal position, or continuous scanning with a large spot at a defocus position;

the continuous scanning is selected from a single continuous scanning mode or a multiple continuous scanning mode; and an energy density of the laser irradiation is greater than or equal to an energy density threshold required to convert the carbon-containing precursor material into the laser induced coating graphene; the laser irradiation is continuous laser irradiation or pulsed laser irradiation; a wavelength of the laser irradiation is 200 nm to 400 nm in an ultraviolet region, 400 nm to 700 nm in a visible region, or 700 nm to 10600 nm in an infrared region.

8. The method according to claim 7, wherein subjecting the glass fiber paper coated with the carbon-containing precursor material to laser irradiation scanning comprises:

subjecting upper and lower surfaces of the glass fiber paper coated with the carbon-containing precursor material to laser irradiation scanning, such that the upper and lower surfaces of the glass fiber paper are coated with the laser induced coating graphene.

9. The method according to claim 1, wherein the glass fiber is entirely coated by the laser induced coating graphene.

* * * * *